United States Patent
Chang et al.

(10) Patent No.: US 11,788,211 B2
(45) Date of Patent: Oct. 17, 2023

(54) INFRARED REFLECTING FIBER AND FABRICATING METHOD THEREOF

(71) Applicant: TAIWAN TEXTILE RESEARCH INSTITUTE, New Taipei (TW)

(72) Inventors: Sheng-Shan Chang, New Taipei (TW); Jo-Cheng Chiang, New Taipei (TW); Chao-Huei Liu, New Taipei (TW)

(73) Assignee: TAIWAN TEXTILE RESEARCH INSTITUTE, New Taipei (TW)

( * ) Notice: Subject to any disclaimer, the term of this patent is extended or adjusted under 35 U.S.C. 154(b) by 481 days.

(21) Appl. No.: 16/941,584

(22) Filed: Jul. 29, 2020

(65) Prior Publication Data

US 2021/0332503 A1    Oct. 28, 2021

(30) Foreign Application Priority Data

Apr. 28, 2020   (TW) ................. 109114223

(51) Int. Cl.
| | | |
|---|---|---|
| *D01F 1/10* | (2006.01) | |
| *C08L 67/02* | (2006.01) | |
| *C09C 1/36* | (2006.01) | |
| *C09C 1/62* | (2006.01) | |
| *D01F 6/92* | (2006.01) | |

(52) U.S. Cl.
CPC ............ *D01F 1/106* (2013.01); *C08L 67/02* (2013.01); *C09C 1/363* (2013.01); *C09C 1/3623* (2013.01); *C09C 1/3669* (2013.01); *C09C 1/62* (2013.01); *D01F 6/92* (2013.01); *C01P 2002/54* (2013.01); *C01P 2004/62* (2013.01); *C01P 2006/62* (2013.01); *C01P 2006/63* (2013.01); *C01P 2006/64* (2013.01); *C08L 2203/12* (2013.01)

(58) Field of Classification Search
None
See application file for complete search history.

(56) References Cited

U.S. PATENT DOCUMENTS

| | | |
|---|---|---|
| 9,163,140 B2 | 10/2015 | Bienmuller et al. |
| 10,550,262 B2 | 2/2020 | Shimoharai et al. |
| 2011/0064935 A1* | 3/2011 | Scherer ............... D03D 15/54 |
| | | 428/221 |
| 2014/0335354 A1 | 11/2014 | Ohga et al. |

FOREIGN PATENT DOCUMENTS

| | | |
|---|---|---|
| CN | 102337603 A | 2/2012 |
| CN | 103347946 A | 10/2013 |
| CN | 106283255 A | 1/2017 |
| CN | 106319685 A | 1/2017 |
| CN | 106637454 A | 5/2017 |
| CN | 107614610 A | 1/2018 |
| CN | 109487359 A | 3/2019 |
| JP | 4097926 B2 | 6/2008 |
| JP | 2010-285722 A | 12/2010 |
| JP | 6005070 B2 | 10/2016 |
| JP | 2017061767 A | 3/2017 |
| KR | 10-2016-0070262 A | 6/2016 |
| TW | I445684 B | 7/2014 |
| TW | I693310 | 5/2020 |
| WO | 2014/041499 A1 | 3/2014 |
| WO | 2016179769 A1 | 11/2016 |

* cited by examiner

*Primary Examiner* — Jeffrey D Washville
(74) *Attorney, Agent, or Firm* — McClure, Qualey & Rodack, LLP

(57) ABSTRACT

An infrared reflecting fiber includes 76.0 parts by weight to 88.5 parts by weight of a carrier, 1.8 parts by weight to 4.0 parts by weight of an infrared reflecting composition, 2.5 parts by weight to 7.5 parts by weight of a titanium dioxide containing composition, and 6.0 parts by weight to 16.0 parts by weight of a color adjusting composition. The carrier includes polyethylene terephthalate (PET). When a content of 5.0 wt % to 7.5 wt % of the infrared reflecting composition and a balance of the carrier are mixed together to form a first fiber, a maximum infrared reflectivity of the first fiber is between 61% and 70%.

11 Claims, No Drawings

INFRARED REFLECTING FIBER AND FABRICATING METHOD THEREOF

RELATED APPLICATION

This application claims priority to Taiwan Application Serial Number 109114223, filed Apr. 28, 2020, which is herein incorporated by reference.

BACKGROUND

Field of Invention

The present disclosure relates to a textile material and a method of fabricating the same, and particularly relates to an infrared reflecting fiber and a method of fabricating the same.

Description of Related Art

Under a trend of globalization, textile industry faces strong pressure due to competition. Textile traders must constantly develop new technologies and diversified products in order to face global competition.

In recent years, due to greenhouse effect and global warming, the average air temperature has continued to rise. Facing the increasingly hot climate, various shading fabrics focus more on light blocking and heat reflection in order to enhance its thermal insulation effect and achieve protection. In addition, since dark-colored fabrics are current fashion trends, how to effectively improve the thermal insulation of the fabrics, especially the thermal insulation of the dark-colored fabrics, has currently become a rather important issue.

SUMMARY

An aspect of the present disclosure relates in general to an infrared reflecting fiber, which is suitable for applying to dark-colored fabrics.

According to some embodiments of the present disclosure, the infrared reflecting fiber includes 76.0 parts by weight to 88.5 parts by weight of a carrier, 1.8 parts by weight to 4.0 parts by weight of an infrared reflecting composition, 2.5 parts by weight to 7.5 parts by weight of a titanium dioxide containing composition, and 6.0 parts by weight to 16.0 parts by weight of a color adjusting composition. The carrier includes polyethylene terephthalate (PET). When a content of 5.0 wt % to 7.5 wt % of the infrared reflecting composition and a balance of the carrier are mixed together to form a first fiber, a maximum infrared reflectivity of the first fiber is between 61% and 70%.

In some embodiments of the present disclosure, the infrared reflecting composition includes 74 parts by weight to 78 parts by weight of a substrate powder, 18 parts by weight to 22 parts by weight of an infrared reflecting colorant, and 2 parts by weight to 6 parts by weight of an additive.

In some embodiments of the present disclosure, the substrate powder includes polybutylene terephthalate (PBT).

In some embodiments of the present disclosure, the infrared reflecting colorant includes a titanium-nickel-antimony metal composite material.

In some embodiments of the present disclosure, when a content of 1.0 wt % to 1.5 wt % of the infrared reflecting colorant and a balance of the carrier are mixed together to form a second fiber, a maximum infrared reflectivity of the second fiber is between 64% and 70%.

In some embodiments of the present disclosure, the infrared reflecting colorant includes a chromium-iron metal composite material.

In some embodiments of the present disclosure, when a content of 1.0 wt % to 1.5 wt % of the infrared reflecting colorant and a balance of the carrier are mixed together to form a third fiber, a maximum infrared reflectivity of the third fiber is between 61% and 63%.

In some embodiments of the present disclosure, the additive includes a paraffin-based dispersant and a heat stabilizer.

In some embodiments of the present disclosure, a particle diameter of the infrared reflecting colorant is between 150 nm and 250 nm.

In some embodiments of the present disclosure, a titanium dioxide in the titanium dioxide containing composition is rutile.

In some embodiments of the present disclosure, the color adjusting composition includes 74 parts by weight to 78 parts by weight of a substrate powder, 18 parts by weight to 22 parts by weight of a color adjusting colorant, and 2 parts by weight to 6 parts by weight of an additive.

In some embodiments of the present disclosure, a particle diameter of the color adjusting colorant is between 150 nm and 250 nm.

Another aspect of the present disclosure relates in general to a method of fabricating an infrared reflecting fiber.

According to some embodiments of the present disclosure, the method of fabricating the infrared reflecting fiber includes the following steps: mixing 1.8 parts by weight to 4.0 parts by weight of an infrared reflecting composition, 2.5 parts by weight to 7.5 parts by weight of a titanium dioxide containing composition, 6.0 parts by weight to 16.0 parts by weight of a color adjusting composition, and 76.0 parts by weight to 88.5 parts by weight of a carrier, in which when a content of 5.0 wt % to 7.5 wt % of the infrared reflecting composition and a balance of the carrier are mixed together to form a first fiber, a maximum infrared reflectivity of the first fiber is between 61% and 70%.

In some embodiments of the present disclosure, a method of fabricating the infrared reflecting composition includes the following steps: performing a liquid grinding step to an infrared reflecting colorant; performing a drying step to form a refined infrared reflecting colorant after the liquid grinding step; and evenly mixing 74 parts by weight to 78 parts by weight of a substrate powder, 18 parts by weight to 22 parts by weight of the refined infrared reflecting colorant, and 2 parts by weight to 6 parts by weight of an additive to obtain the infrared reflecting composition.

In some embodiments of the present disclosure, a particle diameter of the refined infrared reflecting colorant is between 150 nm and 250 nm.

In some embodiments of the present disclosure, the liquid grinding step includes the following steps: mixing 65 parts by weight to 80 parts by weight of a water, 20 parts by weight to 30 parts by weight of the infrared reflecting colorant, and 1 part by weight to 2 parts by weight of a liquid dispersant; and grinding with a planetary ball mill at a speed of 100 rpm to 300 rpm for 4.5 hours to 5.5 hours.

In some embodiments of the present disclosure, a method of fabricating the titanium dioxide containing composition includes the following steps: performing a liquid grinding step to a titanium dioxide; performing a drying step to form a refined titanium dioxide after the liquid grinding step; and evenly mixing 74 parts by weight to 78 parts by weight of a substrate powder, 18 parts by weight to 22 parts by weight of the refined titanium dioxide, and 2 parts by weight to 6 parts by weight of an additive to obtain the titanium dioxide containing composition.

In some embodiments of the present disclosure, a particle diameter of the refined titanium dioxide is between 150 nm and 250 nm.

In some embodiments of the present disclosure, the liquid grinding step includes the following steps: mixing 65 parts by weight to 80 parts by weight of a water, 20 parts by weight to 30 parts by weight of the titanium dioxide, and 1 part by weight to 2 parts by weight of a liquid dispersant; and grinding with a planetary ball mill at a speed of 100 rpm to 300 rpm for 4.5 hours to 5.5 hours.

In some embodiments of the present disclosure, a method of fabricating the color adjusting composition includes the following steps: evenly mixing 74 parts by weight to 78 parts by weight of a substrate powder, 18 parts by weight to 22 parts by weight of a color adjusting colorant, and 2 parts by weight to 6 parts by weight of an additive to obtain the color adjusting composition.

In the aforementioned embodiments of the present disclosure, by mixing the carrier, the infrared reflecting composition, the titanium dioxide containing composition, and the color adjusting composition in a specific ratio, the infrared reflecting fiber having low luminance and high infrared reflectivity is fabricated. Therefore, the dark-colored fabric fabricated by using the infrared reflecting fiber has good thermal insulation effect.

DETAILED DESCRIPTION

The present disclosure relates to an infrared reflecting fiber and a method of fabricating the same. By evenly mixing the carrier, the infrared reflecting composition, the titanium dioxide containing composition, and the color adjusting composition in a specific ratio, the infrared reflecting fiber having low luminance and high infrared reflectivity is fabricated, thereby fabricating a dark-colored fabric with good thermal insulation effect.

The method of fabricating the infrared reflecting fiber of the present disclosure includes mixing 76.0 parts by weight to 88.5 parts by weight of the carrier, 1.8 parts by weight to 4.0 parts by weight of the infrared reflecting composition, 2.5 parts by weight to 7.5 parts by weight of the titanium dioxide containing composition, and 6.0 parts by weight to 16.0 parts by weight of the color adjusting composition to form the infrared reflecting fiber with a dark color and high infrared reflectivity. It should be understood that the "infrared" mentioned in the present disclosure refers to a long wavelength radiation with a wavelength between 700 nm and 1600 nm, also referred to as "near infrared".

Each component in the infrared reflecting fiber and the infrared reflecting fiber itself will be discussed in detail in the following descriptions.

<Carrier>

The carrier includes polyethylene terephthalate (PET). In some embodiments, the carrier may further include polybutylene terephthalate (PBT) or other polyester. In other words, the carrier may be a single component or a mixture of multiple components.

<Infrared Reflecting Composition>

The infrared reflecting composition is configured to enhance the infrared reflectivity of the infrared reflecting fiber of the present disclosure. Specifically, when a content of 5.0 wt % to 7.5 wt % of the infrared reflecting composition and a balance of the carrier are mixed together to form a first fiber, a maximum infrared reflectivity of the first fiber and a fabric fabricated therefrom is between 61% and 70%. In some embodiments, the infrared reflecting composition may include 74 parts by weight to 78 parts by weight of a substrate powder, 18 parts by weight to 22 parts by weight of an infrared reflecting colorant, and 2 parts by weight to 6 parts by weight of an additive.

In some embodiments, the substrate powder may include polybutylene terephthalate. In some embodiments, the substrate powder may further include polyethylene terephthalate or other polyester. In other words, the substrate powder may be a single component or a mixture of multiple components.

In some embodiments, the infrared reflecting colorant may be a yellow infrared reflecting colorant, and the yellow infrared reflecting colorant may include a titanium-nickel-antimony metal composite material, so as to enhance the infrared reflectivity of a fiber fabricated therefrom. Specifically, when a content of 1.0 wt % to 1.5 wt % of the yellow infrared reflecting colorant and a balance of the carrier are mixed together to form a second fiber, a maximum infrared reflectivity of the second fiber and a fabric fabricated therefrom may be between 64% and 70%. In some embodiments, L*, a*, and b* values in the L*a*b* color space of the second fiber and the fabric fabricated therefrom may respectively be between 88.2 and 88.9, between −7.5 and −0.7, and between 28.4 and 33.3, indicating that a color of the second fiber and the fabric fabricated therefrom is yellow. In some embodiments, a fiber fitness of the second fiber may be between 50d/24f and 300d/144f, and fiber strength of the second fiber may be larger than 3.0 g/d, so as to meet the industrial standards.

In some embodiments, the infrared reflecting colorant may be a black infrared reflecting colorant, and the black infrared reflecting colorant may include a chromium-iron metal composite material, so as to enhance the infrared reflectivity of the fiber fabricated therefrom. Specifically, when a content of 1.0 wt % to 1.5 wt % of the black infrared reflecting colorant and a balance of the carrier are mixed together to form a third fiber, a maximum infrared reflectivity of the third fiber and a fabric fabricated therefrom may be between 61% and 63%. In some embodiments, L*, a*, and b* values in the L*a*b* color space of the third fiber and the fabric fabricated therefrom may respectively be between 44.0 and 50.0, between 3.5 and 3.8, and between 5.4 and 5.7, indicating that a color of the third fiber and the fabric fabricated therefrom is black. In some embodiments, a fiber fitness of the third fiber may be between 50d/24f and 300d/144f, and fiber strength of the third fiber may be larger than 3.0 g/d, so as to meet the industrial standards.

In some embodiments, the additive may include a paraffin-based dispersant and a heat stabilizer. The paraffin-based dispersant can make the substrate powder and the infrared reflecting colorant be evenly dispersed, and the thermal stabilizer can prevent the infrared reflecting colorant from degradation at a high temperature. In some embodiments, the paraffin-based dispersant is, for example, D1841E (a product name, purchased from EMS-GRIVORY Co., Ltd.), and the thermal stabilizer is, for example, Eversorb90 (a product name, purchased from Everlight Chemical Co., Ltd.) or Eversorb12 (a product name, purchased from Everlight Chemical Co., Ltd.).

A method of fabricating the infrared reflecting composition will be discussed in the following descriptions.

Firstly, a liquid grinding step is performed to the infrared reflecting colorant. In some embodiments, the liquid grinding step includes mixing 65 parts by weight to 80 parts by weight of a water, 20 parts by weight to 30 parts by weight of the infrared reflecting colorant, and 1 part by weight to 2 parts by weight of a liquid dispersant and grinding with a planetary ball mill at a speed of 100 rpm to 300 rpm for 4.5 hours to 5.5 hours. In some embodiments, the liquid dispersant may include a non-ionic dispersant. In some embodiments, the planetary ball mill may be with zirconium beads.

Then, a drying step is performed to form a refined infrared reflecting colorant after the liquid grinding step. In some embodiments, a particle diameter of the refined infrared reflecting colorant may be between 150 nm and 250 nm. In some embodiments, a drying temperature may be between 100° C. and 110° C., and a drying time may be between 7.5 hours and 8.5 hours.

Subsequently, 74 parts by weight to 78 parts by weight of the substrate powder, 18 parts by weight to 22 parts by weight of the refined infrared reflecting colorant, and 2 parts by weight to 6 parts by weight of the additive are evenly mixed to obtain the infrared reflecting composition. In some embodiments, the infrared reflecting composition may further undergo kneading granulation to form into masterbatches (plastic granules), so as to improve the storage convenience. In some embodiments, a kneading temperature may be between 230° C. and 280° C. In some embodiments, a rotation speed may be between 200 rpm and 300 rpm.

<Titanium Dioxide Containing Composition>

The titanium dioxide containing composition is configured to enhance the infrared reflectivity of the infrared reflecting fiber of the present disclosure. In some embodiments, a titanium dioxide in the titanium dioxide containing composition may be rutile, so as to enhance the infrared reflectivity of the fiber fabricated therefrom. Specifically, when a content of 1.0 wt % of the titanium dioxide and a balance of the carrier are mixed together to form a fourth fiber, a maximum infrared reflectivity of the fourth fiber and a fabric fabricated therefrom may be 72%. In some embodiments, L*, a*, and b* values in the L*a*b* color space of the fourth fiber and the fabric fabricated therefrom may respectively be 95.3, −0.4, and 2.4, indicating that a color of the fourth fiber and the fabric fabricated therefrom is white. In some embodiments, a fiber fitness of the fourth fiber may be between 50d/24f and 300d/144f, and fiber strength of the fourth fiber may be larger than 3.0 g/d, so as to meet the industrial standards.

A method of fabricating the titanium dioxide containing composition will be discussed in the following descriptions.

Firstly, a liquid grinding step is performed to the titanium dioxide. In some embodiments, the liquid grinding step includes mixing 65 parts by weight to 80 parts by weight of a water, 20 parts by weight to 30 parts by weight of the titanium dioxide, and 1 part by weight to 2 parts by weight of a liquid dispersant and grinding with a planetary ball mill at a speed of 100 rpm to 300 rpm for 4.5 hours to 5.5 hours. In some embodiments, the liquid dispersant may include a non-ionic dispersant. In some embodiments, the planetary ball mill may be with zirconium beads.

Then, a drying step is performed to form a refined titanium dioxide after the liquid grinding step. In some embodiments, a particle diameter of the refined titanium dioxide may be between 150 nm and 250 nm. In some embodiments, a drying temperature may be between 100° C. and 110° C., and a drying time may be between 7.5 hours and 8.5 hours.

Subsequently, 74 parts by weight to 78 parts by weight of the substrate powder, 18 parts by weight to 22 parts by weight of the refined titanium dioxide, and 2 parts by weight to 6 parts by weight of the additive are evenly mixed to obtain the titanium dioxide containing composition. In some embodiments, the titanium dioxide containing composition may further undergo kneading granulation to form into masterbatches (plastic granules), so as to improve the storage convenience. In some embodiments, a kneading temperature may be between 230° C. and 280° C. In some embodiments, a rotation speed may be between 200 rpm and 300 rpm.

<Color Adjusting Composition>

The color adjusting composition is configured to make the infrared reflecting fiber of the present disclosure have a lower luminance, thereby showing a darker color. In some embodiments, the color adjusting composition may include 74 parts by weight to 78 parts by weight of a substrate powder, 18 parts by weight to 22 parts by weight of a color adjusting colorant, and 2 parts by weight to 6 parts by weight of an additive.

In some embodiments, the substrate powder may include polybutylene terephthalate. In some embodiments, the substrate powder may further include polyethylene terephthalate or other polyester. In other words, the substrate powder may be a single component or a mixture of multiple components.

In some embodiments, the color adjusting colorant may include yellow color adjusting colorant, red color adjusting colorant, blue color adjusting colorant, green color adjusting colorant, and purple color adjusting colorant. In some embodiments, a particle diameter of the color adjusting colorant may be between 150 nm and 500 nm. When a content of 1.0 wt % of the above color adjusting colorants are respectively mixed together with a balance of the carrier to form corresponding fibers, L*, a*, and b* values in the L*a*b* color space, a maximum infrared reflectivity, a fiber fitness, and fiber strength of the corresponding fibers are shown in Table 1.

TABLE 1

| | color of color adjusting colorant | | | | |
|---|---|---|---|---|---|
| | yellow | red | blue | green | purple |
| L* value | 76.0 | 49.6 | 45.0 | 55.3 | 24.6 |
| a* value | 6.2 | 56.9 | −16.9 | −58.2 | 19.0 |
| b* value | 58.5 | 9.0 | −39.3 | −4.3 | −31.9 |
| maximum infrared reflectivity (%) | 73 | 71 | 68 | 61 | 55 |
| fiber fitness (d/36f) | 75.2 | 75.2 | 75.1 | 74.5 | 74.2 |
| fiber strength (gf/d) | 3.4 | 3.3 | 3.5 | 3.4 | 3.6 |

According to the L*a*b* values in Table 1, when a content of 1.0 wt % of the yellow color adjusting colorant, red color adjusting colorant, blue color adjusting colorant, green color adjusting colorant, and purple color adjusting colorant are respectively mixed together with a balance of the carrier to form the corresponding fibers, colors of the corresponding fibers are yellow, red, blue, green, and purple, respectively. In addition, each fiber can have good maximum infrared reflectivity as well as fiber fitness and fiber strength that meet the industrial standards.

In some embodiments, the additive may include a paraffin-based dispersant and a heat stabilizer. The paraffin-based dispersant can make the substrate powder and the infrared reflecting colorant be evenly dispersed, and the thermal stabilizer can prevent the infrared reflecting colorant from degradation at a high temperature. In some embodiments, the paraffin-based dispersant is, for example, D1841E (a product name, purchased from EMS-GRIVORY Co., Ltd.), and the thermal stabilizer is, for example, Eversorb90 (a product name, purchased from Everlight Chemical Co., Ltd.) or Eversorb12 (a product name, purchased from Everlight Chemical Co., Ltd.).

A method of fabricating the color adjusting composition will be discussed in the following descriptions.

74 parts by weight to 78 parts by weight of the substrate powder, 18 parts by weight to 22 parts by weight of the color adjusting colorant, and 2 parts by weight to 6 parts by weight of the additive are evenly mixed to obtain the color adjusting composition. In some embodiments, the color adjusting composition may further undergo kneading granulation to form into masterbatches (plastic granules), so as to improve the storage convenience. In some embodiments, a kneading temperature may be between 230° C. and 280° C. In some embodiments, a rotation speed may be between 200 rpm and 300 rpm. In some embodiments, a particle diameter of the color adjusting colorant may be between 150 nm and 500 nm.

<Infrared Reflecting Fiber>

The present disclosure then mix 76.0 parts by weight to 88.5 parts by weight of the carrier, 1.8 parts by weight to 4.0 parts by weight of the infrared reflecting composition, 2.5 parts by weight to 7.5 parts by weight of the titanium dioxide containing composition, and 6.0 parts by weight to 16.0 parts by weight of the color adjusting composition, and then perform a melt-spinning step to obtain the infrared reflecting fiber with a dark color and high infrared reflectivity. In some embodiments, a spinning temperature of the melt-spinning step may be between 280° C. and 290° C. In some embodiments, a spinning speed of the melt-spinning step may be greater than or equal to 2500 m/min.

In some embodiments, the infrared reflecting fiber may be, for example, a single-component fiber. In other embodiments, the infrared reflecting fiber may be, for example, a sheath-core fiber. In some embodiments, a fiber fitness of the infrared reflecting fiber may be between 50d/24f and 300d/144f, and fiber strength may be greater than 3.0 g/d, so as to meet the industrial standards.

In the following descriptions, multiple comparative examples and embodiments are listed to verify the efficacies of the present disclosure. The components and contents of each comparative example and embodiment are shown in Table 2, in which comparative examples 1 to 12 and embodiments 1 to 8 are single-component fibers, and embodiment 9 is a sheath-core fiber with a sheath/core weight ratio of 50/50. It should be understood that the carrier, infrared reflecting composition, titanium dioxide containing composition, and/or color adjusting composition in each comparative example and embodiment are fabricated by the aforementioned components and methods.

For example, when the infrared reflecting composition is represented as "yellow", it implies that it is fabricated by using the aforementioned yellow infrared reflecting colorant, and when the color adjusting composition is represented as "yellow+red+purple", it implies that it is fabricated by using the aforementioned yellow, red, and purple color adjusting colorants.

TABLE 2

|  | fiber fitness (d/36f) | carrier | infrared reflecting composition | titanium dioxide containing composition | color adjusting composition |
|---|---|---|---|---|---|
| comparative example 1 | 74.2 | PET (100.0) | N/A | N/A | N/A |
| comparative example 2 | 75.2 | PBT (100.0) | N/A | N/A | N/A |
| comparative example 3 | 74.5 | PET (95.0) | yellow (5.0) | N/A | N/A |
| comparative example 4 | 75.1 | PET (92.5) | yellow (7.5) | N/A | N/A |
| comparative example 5 | 75.5 | PET (95.0) | black (5.0) | N/A | N/A |
| comparative example 6 | 75.6 | PET (92.5) | black (7.5) | N/A | N/A |
| comparative example 7 | 74.5 | PET (95.0) | N/A | white (5.0) | N/A |
| comparative example 8 | 75.2 | PET (95.0) | N/A | N/A | yellow (5.0) |
| comparative example 9 | 75.2 | PET (95.0) | N/A | N/A | red (5.0) |
| comparative example 10 | 75.1 | PET (95.0) | N/A | N/A | blue (5.0) |
| comparative example 11 | 74.5 | PET (95.0) | N/A | N/A | green (5.0) |
| comparative example 12 | 74.2 | PET (95.0) | N/A | N/A | purple (5.0) |
| embodiment 1 | 74.6 | PET (76.0) | yellow (4.0) | white (5.0) | yellow + red + purple (4.0 + 5.0 + 6.0) |
| embodiment 2 | 74.8 | PET (76.0) | yellow (3.0) | white (5.0) | yellow + red + green + purple (3.0 + 4.0 + 3.0 + 6.0) |
| embodiment 3 | 75.2 | PET (76.0) | yellow (3.0) | white (5.0) | yellow + red + green + purple (3.0 + 3.0 + 4.0 + 6.0) |
| embodiment 4 | 74.9 | PET (88.5) | black (3.0) | white (2.5) | red + green (1.0 + 5.0) |
| embodiment 5 | 75.1 | PET (86.0) | black (3.0) | white (5.0) | red + green (1.0 + 5.0) |

TABLE 2-continued

| | fiber fitness (d/36f) | carrier | infrared reflecting composition | titanium dioxide containing composition | color adjusting composition |
|---|---|---|---|---|---|
| embodiment 6 | 75.3 | PET (83.5) | black (3.0) | white (7.5) | red + green (1.0 + 5.0) |
| embodiment 7 | 75.4 | PET (81.0) | black (3.0) | white (7.5) | red + green (1.0 + 7.5) |
| embodiment 8 | 75.1 | PET (82.0) | yellow (3.0) | white (4.0) | red + green + purple (2.0 + 7.0 + 2.0) |
| embodiment 9 (core-sheath weight ratio: 50/50) | 77.0 | sheath:PET (44.25) core:PET (40.20) | N/A yellow (1.8) | white (2.5) N/A | red (3.25) green + purple (7.0 + 1.0) |

Note:
contents in parentheses, in which the unit is parts by weight

Experiment 1: L*a*b* Values, Maximum Infrared Reflectivity, and Surface Temperature Change Tests for Fabrics In this experiment, the fibers of the aforementioned comparative examples and embodiments are respectively fabricated into fabrics for the L*a*b* values, maximum infrared reflectivity, and surface temperature change tests. In the surface temperature change test, the condition is to use a halogen lamp with a power of 500 W and a wavelength of 750 nm to irradiate the fabrics for 10 minutes from a vertical distance of 100 cm. The testing results are shown in Table 3.

TABLE 3

| | L* value | a* value | b* value | maximum infrared reflectivity (%) | surface temperature change of fabric (° C.) |
|---|---|---|---|---|---|
| comparative example 1 | 93.8 | −0.2 | 2.3 | 61 | 3.57 |
| comparative example 2 | 93.4 | −0.2 | 2.1 | 60 | 3.79 |
| comparative example 3 | 88.9 | −0.7 | 28.4 | 64 | 5.08 |
| comparative example 4 | 89.2 | −7.5 | 33.3 | 70 | 5.16 |
| comparative example 5 | 50.0 | 3.5 | 5.4 | 63 | 5.75 |
| comparative example 6 | 44.0 | 3.8 | 5.7 | 61 | 7.93 |
| comparative example 7 | 95.3 | −0.4 | 2.4 | 72 | 4.47 |
| comparative example 8 | 76.0 | 6.2 | 58.5 | 73 | 4.59 |
| comparative example 9 | 49.6 | 56.9 | 9.0 | 71 | 6.34 |
| comparative example 10 | 45.0 | −16.9 | −39.3 | 68 | 6.18 |
| comparative example 11 | 55.3 | −58.2 | −4.3 | 61 | 5.94 |
| comparative example 12 | 24.6 | 19.0 | −31.9 | 55 | 6.36 |
| embodiment 1 | 22.7 | 11.8 | −14.2 | 74 | 6.36 |
| embodiment 2 | 20.1 | 3.9 | 5.6 | 74 | 6.41 |
| embodiment 3 | 19.4 | 2.9 | −2.9 | 72 | 6.62 |
| embodiment 4 | 22.7 | −2.7 | −1.5 | 67 | 6.63 |
| embodiment 5 | 25.3 | −2.8 | 3.7 | 71 | 6.49 |
| embodiment 6 | 26.6 | −3.0 | −4.3 | 75 | 6.89 |
| embodiment 7 | 25.4 | −2.7 | −4.4 | 72 | 6.34 |
| embodiment 8 | 18.6 | −0.4 | −3.0 | 73 | 5.60 |
| embodiment 9 | 22.0 | −3.0 | −0.9 | 76 | 5.34 |

Firstly, according to the L*a*b* values in the L*a*b* color space of embodiments 1 to 3, when 3.0 parts by weight to 4.0 parts by weight of the infrared reflecting composition, 5.0 parts by weight of the titanium dioxide containing composition, 15.0 parts by weight to 16.0 parts by weight of the color adjusting composition, and 76.0 parts by weight of the carrier are mixed together to form the infrared reflecting fibers, the color of the infrared reflecting fibers is dark black-purple, and their L* value are between 19.4 and 22.7, showing lower luminance (i.e., a darker color). In addition, the maximum infrared reflectivity of each of the embodiments 1 to 3 is between 72% and 74%, showing good infrared reflectivity. Furthermore, the surface temperatures of the fabrics respectively fabricated by embodiments 1 to 3 are small, showing good thermal insulation effect.

Then, according to the L*a*b* values in the L*a*b* color space of embodiments 4 to 7, when 3.0 parts by weight of the infrared reflecting composition, 2.5 parts by weight to 7.5 parts by weight of the titanium dioxide containing composition, 6.0 parts by weight to 8.5 parts by weight of the color adjusting composition, and 81.0 parts by weight to 88.5 parts by weight of the carrier are mixed together to form the infrared reflecting fibers, the color of the infrared reflecting fibers is dark black-green, and their L* value are between 22.7 and 26.6, showing lower luminance (i.e., a darker color). In addition, the maximum infrared reflectivity of each of the embodiments 4 to 7 is between 67% and 75%, showing good infrared reflectivity. Furthermore, the surface temperatures of the fabrics respectively fabricated by embodiments 4 to 7 are small, showing good thermal insulation effect.

Next, according to the L*a*b* values in the L*a*b* color space of embodiment 8, when 3.0 parts by weight of the infrared reflecting composition, 4.0 parts by weight of the titanium dioxide containing composition, 11.0 parts by weight of the color adjusting composition, and 82.0 parts by weight of the carrier are mixed together to form the infrared reflecting fiber, the color of the infrared reflecting fiber is dark black, and its L* value is 22.0, showing lower luminance (i.e., a darker color). In addition, the maximum infrared reflectivity of the embodiment 8 is 73%, showing good infrared reflectivity. Furthermore, the surface temperature of the fabric fabricated by embodiment 8 is small, showing good thermal insulation effect.

Lastly, embodiment 9 is a sheath-core fiber, the infrared reflecting composition is in the core layer, the titanium dioxide containing composition is in the sheath layer, and the color adjusting composition is in both the core layer and the sheath layer. According to the L*a*b* values in the L*a*b* color space of embodiment 9, when 1.80 parts by weight of the infrared reflecting composition, 11.25 parts by weight of the color adjusting composition, and 84.45 parts by weight of the carrier are mixed together to form the infrared reflecting fiber, the color of the infrared reflecting fiber is dark black, and its L* value is 18.6, showing lower luminance (i.e., a darker color). In addition, the maximum infrared reflectivity of the embodiment 9 is 76%, showing good infrared reflectivity. Furthermore, the surface temperature of the fabric fabricated by embodiment 9 is small, showing good thermal insulation effect.

On the other hand, according to the L*a*b* values in the L*a*b* color space of comparative examples 1 to 2, the fibers fabricated simply by common polyester have higher luminance and cannot show a dark color. According to the L*a*b* values in the L*a*b* color space of comparative examples 3 to 12, the fibers fabricated by merely one of the infrared reflecting composition, the titanium dioxide containing composition, and the color adjusting composition also have higher luminance and cannot show a dark color.

Experiment 2: Washing Fastness, Perspiration Fastness, and Light Fastness Tests for Fabrics In this experiment, the fibers of embodiments 2, 6, 8, and 9 are respectively fabricated into fabrics for the washing fastness, perspiration fastness, and light fastness tests, in which the method of the washing fastness test is AATCC 61-2010 2A, the method of the perspiration fastness test is AATCC 15, and the method of the light fastness test is AATCC 16.2. According to the results, the fabrics fabricated by using the aforementioned embodiments can reach the grades 4 to 5 for the washing fastness and perspiration fastness tests to wool, acrylic, tedron, nylon, cotton, and acetic acid, and the fabrics fabricated by using the aforementioned embodiments can reach the grade 4 or above for the light fastness test. Accordingly, the fabrics fabricated by using the aforementioned embodiments have hardly any color transfer to wool, acrylic, tedron, nylon, cotton, and acetic acid, and can maintain their original color after the light fastness test, so as to meet the needs of users.

According to the aforementioned embodiments of the present disclosure, by evenly mixing the carrier, the infrared reflecting composition, the titanium dioxide containing composition, and the color adjusting composition in a specific ratio, the infrared reflecting fiber having low luminance and high infrared reflectivity is fabricated, thereby fabricating the dark-colored fabric with good thermal insulation effect.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. An infrared reflecting fiber, comprising:
   76.0 parts by weight to 88.5 parts by weight of a carrier, wherein the carrier comprises polyethylene terephthalate (PET);
   1.8 parts by weight to 4.0 parts by weight of an infrared reflecting composition, wherein the infrared reflecting composition comprises 74 parts by weight to 78 parts by weight of a substrate powder, 18 parts by weight to 22 parts by weight of an infrared reflecting colorant, and 2 parts by weight to 6 parts by weight of an additive, and when a content of 5.0 wt % to 7.5 wt % of the infrared reflecting composition and a balance of the carrier are mixed together to form a first fiber, a maximum infrared reflectivity of the first fiber is between 61% and 70%;
   2.5 parts by weight to 7.5 parts by weight of a titanium dioxide containing composition; and
   6.0 parts by weight to 16.0 parts by weight of a color adjusting composition.

2. The infrared reflecting fiber of claim 1, wherein the substrate powder comprises polybutylene terephthalate (PBT).

3. The infrared reflecting fiber of claim 1, wherein the infrared reflecting colorant comprises a titanium-nickel-antimony metal composite material.

4. The infrared reflecting fiber of claim 3, wherein when a content of 1.0 wt % to 1.5 wt % of the infrared reflecting colorant and a balance of the carrier are mixed together to form a second fiber, a maximum infrared reflectivity of the second fiber is between 64% and 70%.

5. The infrared reflecting fiber of claim 1, wherein the infrared reflecting colorant comprises a chromium-iron metal composite material.

6. The infrared reflecting fiber of claim 5, wherein when a content of 1.0 wt % to 1.5 wt % of the infrared reflecting colorant and a balance of the carrier are mixed together to form a third fiber, a maximum infrared reflectivity of the third fiber is between 61% and 63%.

7. The infrared reflecting fiber of claim 1, wherein the additive comprises a paraffin-based dispersant and a heat stabilizer.

8. The infrared reflecting fiber of claim 1, wherein a particle diameter of the infrared reflecting colorant is between 150 nm and 250 nm.

9. The infrared reflecting fiber of claim 1, wherein a titanium dioxide in the titanium dioxide containing composition is rutile.

10. The infrared reflecting fiber of claim 1, wherein the color adjusting composition comprises 74 parts by weight to 78 parts by weight of a substrate powder, 18 parts by weight to 22 parts by weight of a color adjusting colorant, and 2 parts by weight to 6 parts by weight of an additive.

11. The infrared reflecting fiber of claim 10, wherein a particle diameter of the color adjusting colorant is between 150 nm and 250 nm.

* * * * *